GEORGE A. DONATH, INVENTOR.

BY Forest J. Lilly
ATTORNEY

June 8, 1954 G. A. DONATH 2,680,510
BATTERY GROUP ASSEMBLING APPARATUS
Filed Jan. 19, 1952 5 Sheets-Sheet 3

GEORGE A. DONATH,
INVENTOR.

BY
ATTORNEY

June 8, 1954

G. A. DONATH 2,680,510

BATTERY GROUP ASSEMBLING APPARATUS

Filed Jan. 19, 1952

GEORGE A. DONATH,
INVENTOR.

BY

ATTORNEY

June 8, 1954

G. A. DONATH

2,680,510

BATTERY GROUP ASSEMBLING APPARATUS

Filed Jan. 19, 1952

GEORGE A. DONATH,
INVENTOR.

ATTORNEY

Patented June 8, 1954

2,680,510

UNITED STATES PATENT OFFICE 2,680,510

BATTERY GROUP ASSEMBLING APPARATUS

George A. Donath, Los Angeles, Calif.

Application January 19, 1952, Serial No. 267,256

17 Claims. (Cl. 198—35)

This invention relates to the art of manufacturing lead-acid storage batteries and more particularly refers to the procedure of assembling battery plates and intervening separators into groups or stacks to form battery cells. The broad object of the invention is to provide an apparatus for carrying out this procedure rapidly and automatically with minimum attention required by operators other than keeping the apparatus supplied with plates and separators.

Various aids and expedients have been suggested heretofore to facilitate the fabrication of battery cells but, for a number of reasons, the assembling of battery plates and separators into group for the cells has remained largely a manual task. One reason is that battery plates are easily damaged by impact since the plates are made of soft material that is readily gouged and deformed. A further factor of major importance is the exceptionally heavy weight of the individual lead plates with consequent high inertia and momentum encountered in any attempt at rapid movement of the plates by mechanical devices. The weight of the plates also complicates the problem of dispensing the plates from a reserve supply.

In practice it is desirable to assemble the plates and separators in the form of vertical stacks and therefore the plates should be dispensed from supply stacks that are likewise vertical in order to avoid the necessity of rotating each plate in the course of its movement from the supply. In a vertical supply stack of any substantial height, however, a great deal of weight is imposed on the bottom plate making it very difficult to dispense a plate laterally from the bottom of the stack. On the other hand, any arrangement for dispensing from the top of the supply stack presents the equally difficult problem of providing for replenishment of the stack without interrupting or interfering with the dispensing operation. This dilemma among others stemming from the weight of the plates and the vulnerability of the plates to damage has retarded progress in the direction of mass assembly of plates and separators for storage battery cells.

Underlying the invention is the discovery that the plates may be dropped individually without damage for a substantial distance in inches onto a surface of wood or the like if the receiving surface is horizontal and if the plates are horizontal and are so released as to stay in horizontal position while falling. An object of the invention, therefore, is the provision of magazines to hold vertical supply stacks of the plates, each of which magazines has a dispensing mechanism to release the bottom plate of the stack to fall in the described manner to an assembly position on a battery plate separator. A feature of the preferred practice of the invention is that the fall of the plates may be minimized, the vertical distance being, for example, on the order of one or two inches.

Such a plate magazine may be used in various arrangements for assembling the plates and separators of a battery cell. In the preferred practice of the invention, for example, a conveyor moves in a path past a series of stations and a plate magazine positioned above the path at each station drops the plates one by one onto the conveyor. The operation of each plate magazine is synchronized with the movement of the conveyor so that the plates from the successive magazines drop onto the same location on the conveyor and thus the desired stacks are assembled on the conveyor progressively.

While the plate magazines may be synchronized with a continuously moving conveyor, a feature of the preferred practice of the invention is the concept of making it possible to shorten the overall length of the assembling apparatus by moving the conveyor intermittently. This feature may be understood when it is considered that, since separators must alternate with plates in the assembled stacks on the conveyor, a continuously moving conveyor requires nearly as many stations for dispensing separators as for dispensing plates. Thus to assemble a stack for a twenty-one plate battery cell on a continuously moving assembly conveyor requires a total of forty-one stations, there being twenty-one plate dispensing stations and twenty alternate separator dispensing stations. Only twenty-one stations are required, however, if each station has both a plate dispenser and a separator dispenser and the conveyor pauses in its movement momentarily at each station to permit a plate and a separator to be deposited thereon in sequence.

Other objects of the invention relate to the arrangement and specific construction of the means for dispensing plates and separators to the conveyor. One such object is to provide an apparatus with magazines for plates and separators that reveal their content at a glance and may be replenished quickly and conveniently. In this regard a feature of the invention is the use of upright magazines each of which is open entirely on one side to make the content visible, and to permit the entrance of new stock at relatively low levels. An advantage of the preferred embodiment of the plate magazine is that its dispensing means continually urges the plates in the magazine away from the open side of the magazine, as will be explained.

Another object of the invention is to provide a plate magazine and a dispensing mechanism for the magazine both of which may be readily adjusted not only to accommodate and dispense plates of varying widths, but also to accommodate and dispense plates of various thicknesses.

A further specific object is to provide a suitable plate dispensing mechanism for operation above a conveyor and a suitable cooperating separator dispensing mechanism for operation to one side of the path of the conveyor.

The various objects and advantages of the invention will be apparent in the following detailed description considered with the accompanying drawings.

In the drawings, which are to be regarded as merely illustrative,

Figure 3 is a horizontal section taken on the line 3—3 of Figure 1;

Figure 4:
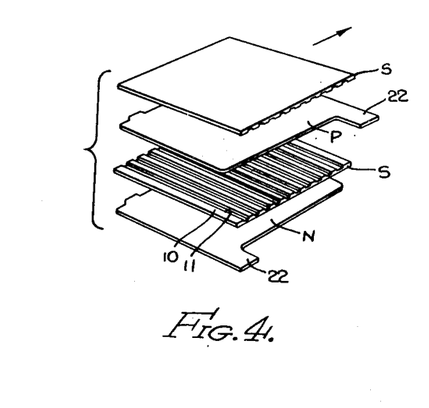
Figure 4 is a perspective view of two plates and two separators in their relative positions of assembly on the conveyor.

The function of the apparatus is to assemble a stack of battery plates and separators in the order indicated in Figure 4. In this order the negative plates designated N and the positive plates designated P alternate and the successive plates are separated by separators designated S. It will be noted in Figure 4 that a separator S has a plane face on one side, and the other side is provided with transverse ribs 10 forming grooves 11. The purpose of the grooves is to provide increased accessibility to the two faces of each positive plate P on the part of the battery fluid and therefore, as may be seen in Figure 4, the grooved faces of the successive separators S in the assembled stack face up and down alternately to lie against the positive plates.

As heretofore stated, it is contemplated that the plates and separators will be deposited on a conveyor at successive stations along the path of the conveyor, and in the preferred practice of the invention to which the present disclosure is directed, it is further contemplated that the conveyor will move intermittently to afford sufficient pause at each station to permit both a plate and a separator to be deposited in succession on the conveyor. The number of such stations, of course, will depend upon the number of plates to be assembled in a stack. At present batteries are made with as few as thirteen plates per cell and as many as twenty-one plates per cell, but more frequently there are either fifteen or seventeen plates in a cell. Preferably, the present apparatus is constructed to provide twenty-one stations for the assembly of twenty-one plates so that the apparatus may be employed to assemble any number of plates now required in battery manufacture. If less than twenty-one plates are to be assembled only a corresponding number of the stations are used.

General arrangement

Figure 1:
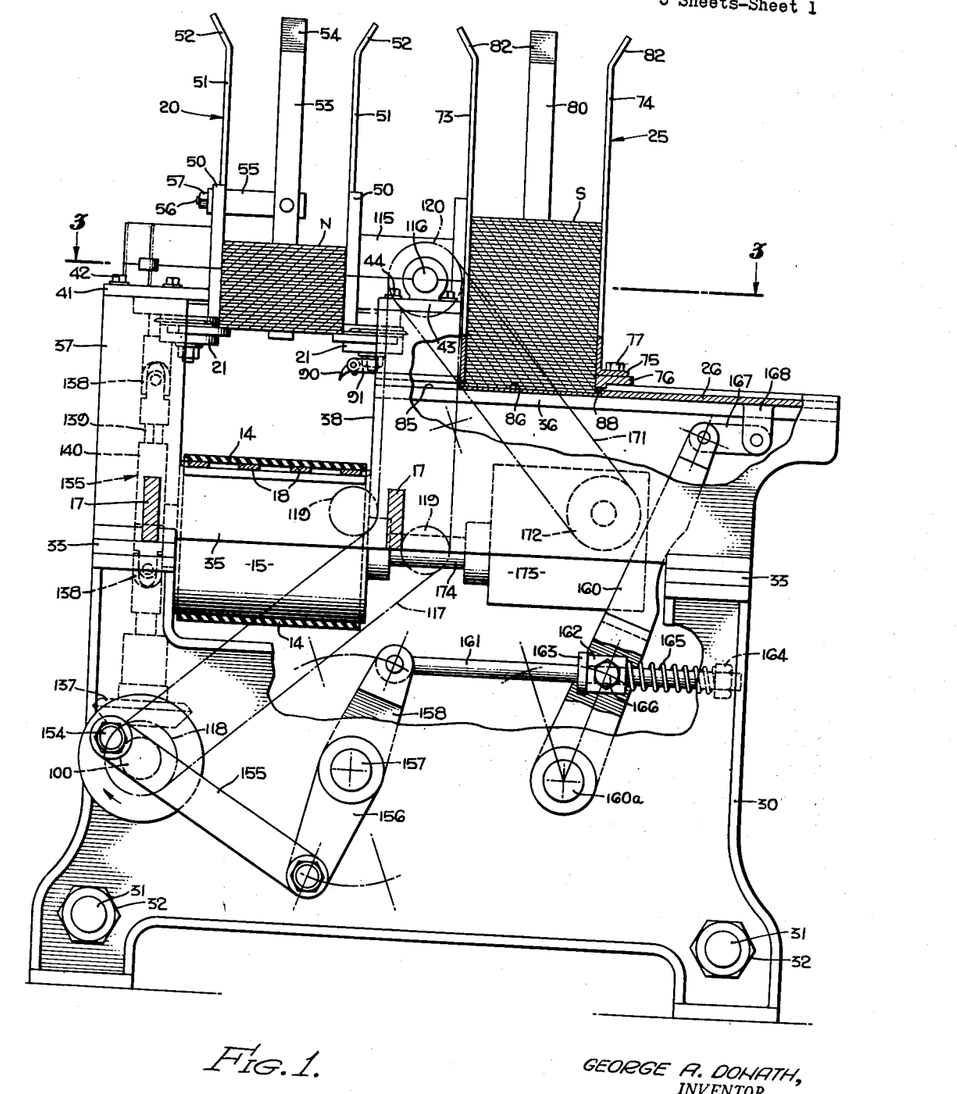
Figure 1 is an end elevation of the presently preferred embodiment of the invention with parts broken away and parts in section for clarity of illustration.

The conveyor comprises a flexible belt 14 that is actuated by a drive roller 15 at the discharge end of the apparatus and at the other end of the apparatus passes around an idler roller 16 journalled in a pair of fixed arms 17. The upper run of the belt 14, on which the assembling operations are carried out, is suitably supported, for example, by spaced longitudinal rails 18 (Figure 1).

Positioned directly above the conveyor belt 14 at equally spaced stations along the path of travel of the upper run of the belt are supply magazines generally designated 20 for holding supply stacks of the battery plates P and N, respectively, each of which magazines has a suitable dispensing mechanism. Preferably, the dispensing mechanism comprises a set or plurality of rotary dispensing members 21. Since each of the battery plates is formed with a tab 22 at one corner for connection to a battery post strap in the completed cell, and since the positive and negative plates are to be connected on opposite sides of the completed cell, the negative plates are placed in the magazines in one position with respect to the plate tab 22 and the positive plates are placed in the magazines in reverse positions, as may be seen in plan in Figure 3.

At the same station as each plate magazine 20, except at the last station on the discharge end of the apparatus, there is a corresponding separator magazine, generally designated 25, to one side of the path of travel of the conveyor belt 14. It is contemplated that the conveyor belt 14 will move intermittently, each periodic advance of the belt equalling the distance between stations and each pause being of sufficient duration to permit first the dropping of a battery plate from the corresponding plate magazine 20, and then the placing of a separator S from the corresponding separator magazine 25 on the dropped plate. As may be seen in Figure 3, the separators S are stacked in the successive separator magazines 25 face up and face down at alternate stations. The separator magazines 25 are provided with suitable dispensing mechanism preferably in the form of a reciprocating dispensing member 26 which displaces the bottommost separator from the stack, laterally to the conveyor belt 14.

To support this general arrangement of cooperating parts, the apparatus may be built with a frame comprising a plurality of transverse upright base members or pedestals 30 that are interconnected by suitable tie rods 31 and nuts 32 near floor level and are further interconnected at their upper edges by a pair of longitudinal sills 33. Mounted on the upper faces of the longitudinal sills 33 is a series of relatively narrow transverse frame members 35 and an alternate series of similar relatively wide transverse frame members 36, the narrow frame members being on the one side of each station that supplies negative plates N, and the wider frame members being at the same side of each station that supplies positive plates P.

As best shown in Figure 1, each of the transverse frame members 35 and 36 provides two upwardly extending support columns 37 and 38 on opposite sides of the belt 14 and also provides a horizontal shelf 40. The support columns 37 are interconnected by plates 41 attached thereto by cap screws 42, and the support columns 38 are interconnected in the same manner by plates 43 secured by cap screws 44. The various plate magazines 20 along the path of the conveyor belt 14 are supported by the plates 41 and 43 and the separator magazines 25 are supported by the horizontal shelves 40.

Means for dispensing the battery plates

Figure 2:
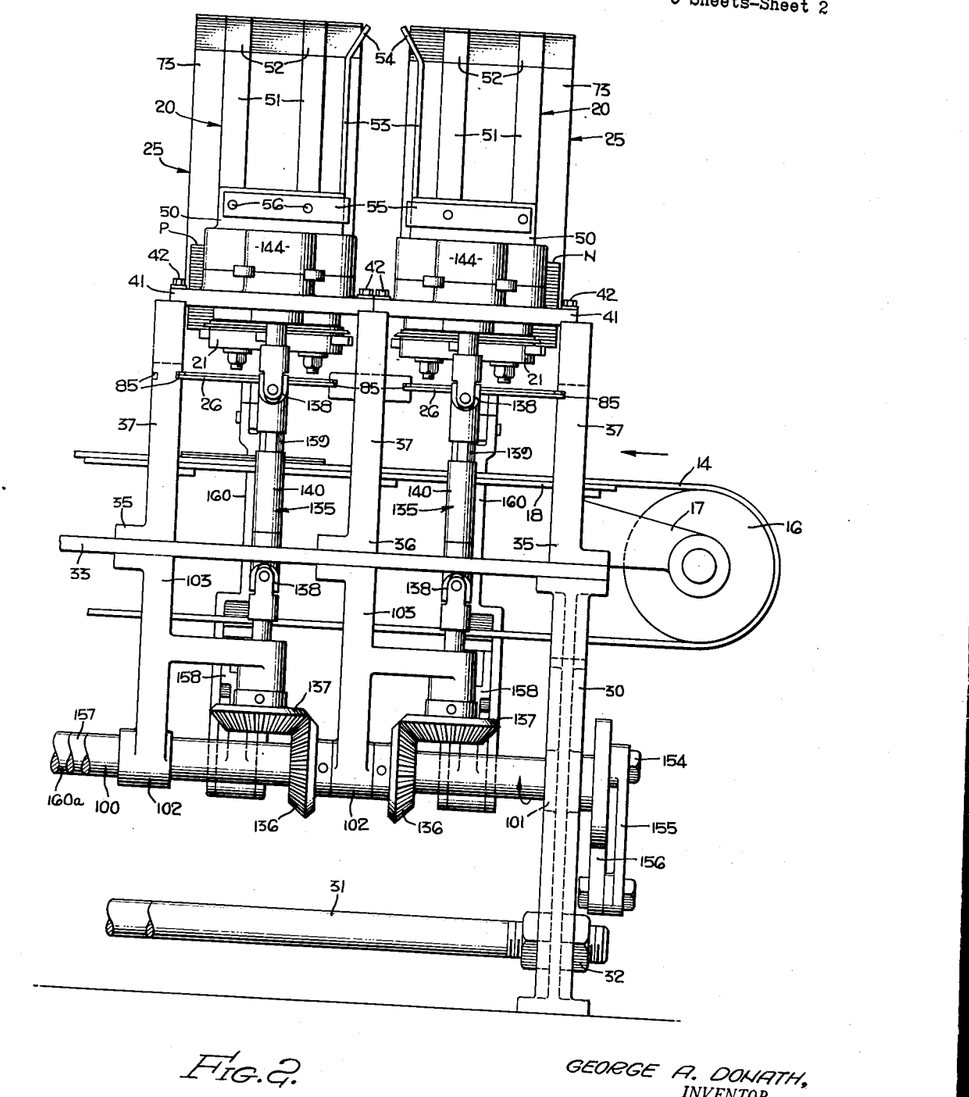
Figure 2 is a side elevation of the same end of the apparatus.

As best shown in Figures 1, 2 and 3, each of the plate magazines 20 is of open construction to reveal its contents at a glance and is completely open on one side to permit the insertion of additional plates at relatively low levels when the supply stacks require replenishment.

In the construction shown, each of the plate magazines 20 includes two side walls 50 supported by the previously mentioned horizontal plates 41 and 43, and each of the two side walls is continued upward by a pair of spaced bars 51 having outward bends 52 at their upper ends. On a third side opposite from the open side, each plate magazine 20 is provided with a similar upright bar 53 with a similar bend 54 at the top. The third bar 53 is mounted on an angular bar 55 that is mounted in turn on one of the side walls 50 by studs 56 and nut 57. Thus the plate magazine 20 has three upright side wall members to confine and guide the supply stack of plates as the plates move progressively to the bottom of the stack. It is also apparent that the upright bar 53 not only serves this purpose but also serves as a stop against which the newly added plates may be placed for alignment with the rest of the supply stack.

The stack of supply plates in each of the plate magazines 20 is supported by the set of rotary dispensing members 21 at the bottom of the magazine and, preferably, as shown in the drawings, there are four such rotary dispensing members 21 to engage each supply stack of plates at four spaced points. The four rotary dispensing members are synchronized for simultaneous releasing action so that the plates fall from the magazines in substantially horizontal position.

Figure 5:
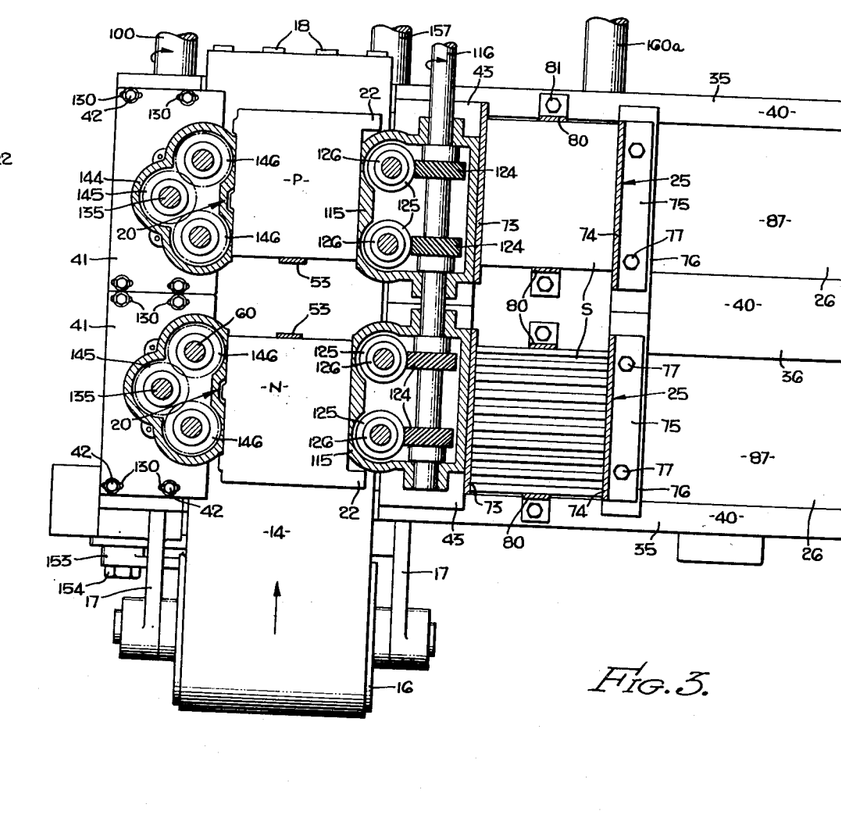
Figure 5 is an enlarged transverse sectional view corresponding to a portion of Figure 1.
Figure 6:
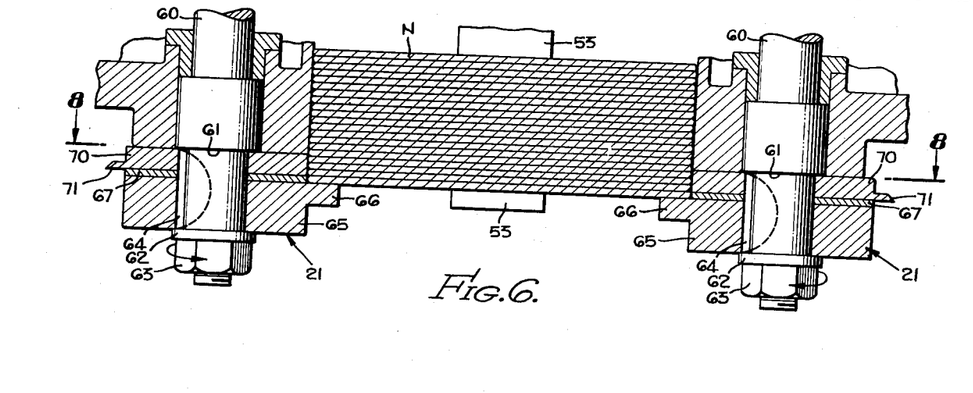
Figure 6 is a further enlarged fragment of Figure 6 showing the plate magazine alone with the rotary dispensing mechanism in one position in its cycle of operation.
Figure 7:
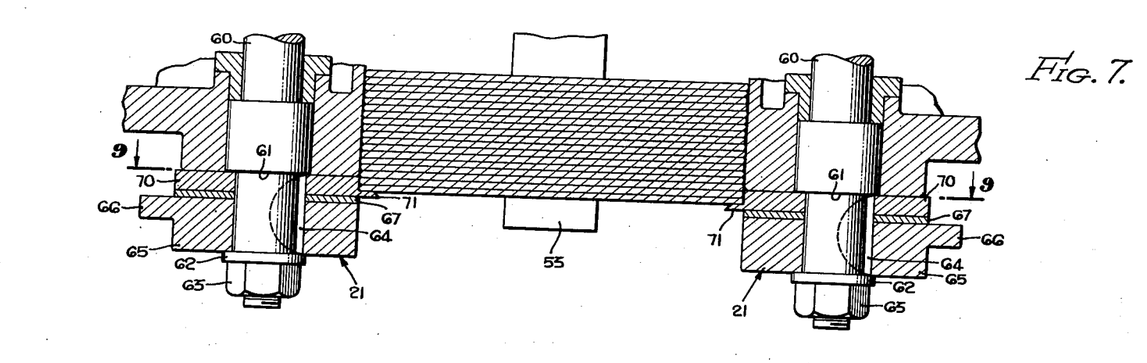
Figure 7 is a view similar to Figure 6 showing the rotary dispensing mechanism in another position in its cycle of operation.
Figure 8:
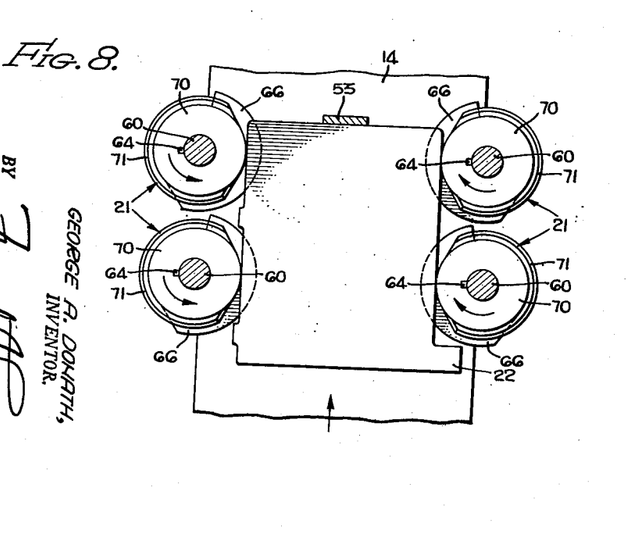
Figure 8 is a horizontal sectional view on a reduced scale taken as indicated by the line 8—8 of Figure 6.
Figure 9:
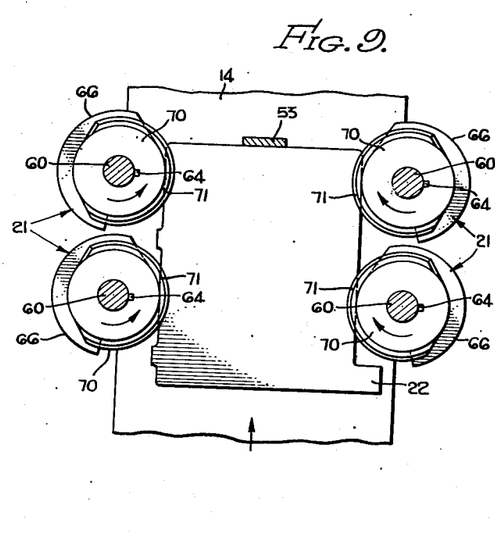
Figure 9 is a similar view taken as indicated by the line 9—9 of Figure 7.

As best shown in Figures 5, 6 and 7 each rotary dispensing member 21 is preferably mounted on the end of a short downwardly extending shaft 60 and is held in place against a circumferential shoulder 61 of the shaft by a washer 62 backed by a suitable nut 63. As shown, each rotary dispensing member may comprise three separate elements locked to the shaft by a suitable key 64. The lowermost element 65 of the three elements is formed with a radial support shoulder 66 which, as shown in Figure 8, may have a circumferential extent of approximately half a circle. The intermediate element 67 of the three elements is a replaceable spacer member of slightly greater thickness than the plates in the magazine. It is contemplated that various sets of such spacers 67 of different thicknesses will be available for use interchangeably so that the apparatus may be employed to assemble battery plates of different thicknesses. The uppermost element 70 of the three is formed with a radial beveled blade 71 which may have a circumferential extent somewhat greater than half a circle. As may be seen in Figure 8 the radial blade 71 is displaced circumferentially from the radial support shoulder 66 with the ends of the blade overlying the ends of the radial shoulder. For clarity of illustration the blade 71 is shown in the drawing as having substantial thickness, but will be relatively thin in actual practice.

The operation of the set of rotary dispensing members 21 may be understood by considering Figures 6 and 8 as representing the beginning of an operating cycle in the course of which cycle each rotary dispensing member makes a complete rotation of 360°. At the start of the cycle the lowermost plate in the supply stack is supported by the lower radial shoulders 66 of the four rotary dispensing members 21. After a few degrees of rotation the leading edge of each of the radial blades 71 simultaneously move against the supply stack at the upper face of the bottom plate to lift the rest of the stack slightly away from the bottom plate. At this point in the cycle the bottom plate is between the blades 71 and the support shoulders 66. With the weight of the supply stack now carried by the four radial blades 71 the four radial support shoulders 66 rotate free of the bottom plate synchronously, thus releasing the bottom plate to drop from the magazine. The cycle is completed by continued rotation returning the four radial support shoulders 66 to their effective positions under the supply stack, and the four blades 71 rotating away from the stack to permit the stack to drop onto the four radial support shoulders.

Means for dispensing the separators

As shown in Figures 1, 2 and 5, each of the separator magazines 25 is of the same general open construction as the plate magazines. Each separator magazine 25 has two opposite side wall members 73 and 74, each side wall member 73 being supported from the corresponding horizontal plate 43 of the apparatus frame, and each side wall member 74 having a bottom flange 75 for support from the horizontal shelves 40 of the apparatus frame. In the construction shown, the bottom flange 75 is mounted on a crossbar 76 by suitable cap screws 77, the crossbar 76 being in turn mounted on a pair of the horizontal shelves 40. The other two sides of the separator magazine 25 are formed by upright bars 80 the lower ends of which are mounted on transverse frame members 35 and 36 by suitable cap screws 81. The two side members 73 and 74, as well as the two bars 80, are each formed with an outward bend 82 at the upper end to guide separators into the magazine when the magazine is being replenished.

At the bottom of each separator magazine 25 the reciprocating dispensing member 26 that supports the supply stack of separators in the magazine is slidingly mounted in guide slots 85 provided by the transverse frame members 35 and 36 respectively, as best shown in Figures 2 and 5. Each reciprocating member 26 may be in the form of a horizontal plate cut away to provide a relatively low support surface 86 on the leading portion of the plate and a higher rearward support surface 87 with an upwardly extending shoulder 88 at the juncture of the two support surfaces. The vertical dimension of the shoulder 88 is slightly less than the thickness of one of the separators S.

The cycle of operation of the reciprocating dispensing member 26 begins with the stack of separators S resting on the leading support surface 86 as shown in Figure 1. As the dispensing member 26 moves towards the conveyor belt 14, the shoulder 88 engages the bottom separator in the supply stack and causes the separator to remain on the leading support surface 86 for displacement from the stack. As the bottom separator is displaced from the supply stack the remainder of the stack comes to rest on the rearward support surface 87 of the dispensing member.

As the displaced separator on the leading support surface 86 reaches its extreme position over the conveyor belt 14, a suitable stop member 90 pivotally mounted in a bracket 91 drops behind the trailing edge of the displaced plate to prevent return movement of the plate with the return movement of the reciprocating member 26. The stop member 90 may be provided with a suitable spring to reinforce its gravitational tendency to drop into the stop position. As the reciprocating dispensing member 26 retreats from the region of the conveyor belt 14, the displaced separator drops into position on the corresponding assembly stack on the conveyor belt and as the reciprocating member reaches its starting position, the rearward support surface 87 is withdrawn from the supply stack of separators to permit the stack to drop onto the leading support surface 86 for the start of a new cycle.

*Means for actuating the moving parts of the apparatus*

Any suitable mechanism may be employed to cause the conveyor belt 14 to move intermittently, and to operate the rotary dispensing members 21 of the plate magazines and the reciprocating dispensing members 26 of the separator magazines in required synchronism with the conveyor belt. In the presently preferred arrangement illustrated by the drawings, all of the moving parts are actuated by a main drive shaft 100 which, in turn, is driven by a suitable prime mover such as a motor (not shown). The drive shaft 100 is journalled in suitable bearings 101 in the base members 30 of the apparatus frame, and in additional bearings 102 carried by additional frame members 103 that extend downwardly from the previously mentioned longitudinal sills 33.

For actuation of the two rotary dispensing members 21 of each plate magazine 20 on the side of the plate magazine towards the corresponding separator magazine 25, a suitable gear box 115 is mounted on each horizontal plate 43 of the apparatus frame. A suitable countershaft 116 extends longitudinally of the apparatus through the various gear boxes 115 and, as indicated in Figure 1, is actuated by the main drive shaft 100 through the medium of a sprocket chain 117. The sprocket chain 117 is driven by a suitable sprocket 118 on the main drive shaft 100 and passes around two idler sprockets 119 to engage a driven sprocket 120 on the countershaft 116.

As shown in Figures 3 and 5, a pair of worm gears 124 on the countershaft 116 in each gear box 115 drives a pair of corresponding worm gears 125 that are mounted respectively on the previously mentioned vertical shafts 60 carrying the rotary dispensing members 21. As shown in Figure 5, each worm gear 125 has a hub portion 126 which is fixed to the shaft 60 by a suitable cross pin 127 and the lower face of the worm gear 125 engages a bearing 128 in the gear box to support the shaft 60 and thereby support the rotary dispensing members 21 that carry the weight of the supply stack of the plates.

In the preferred practice of the invention it is contemplated that the plate magazines 20 will be adjustable to accommodate battery plates of various widths and that such adjustment will be provided by mounting the remaining two outer rotary dispensing members 21 of each plate magazine for movement towards and away from the inner two rotary dispensing members that are actuated by the countershaft 116. In the preferred construction, the outer pair of rotary dispensing members 21 of each plate magazine 20, as well as the corresponding side wall 50 of the plate magazine, are carried by the corresponding horizontal plate 41 of the apparatus frame and the required adjustability is achieved simply by forming each plate 41 (Figure 3) to receive the previously mentioned cap screws 42. Thus, the cap screws 42 may be loosened to permit the plates 41 to be shifted outward or inward as required for battery plates of different dimensions.

Any suitable arrangement may be provided for driving the outer pairs of rotary dispensing members 21 from the main drive shaft 100 in such manner as will permit the described adjustment to accommodate battery plates of different widths. In the construction shown in the drawings, each outer pair of rotary dispensing members 21 is driven from the main drive shaft 100 by a suitable flexible or articulated shaft generally designated 135. In the preferred construction a bevel gear 136 on the main drive shaft 100 is in mesh with a second bevel gear 137 at the lower end of each shaft 135.

The articulated shaft 135 incorporates two universal joints 138 one of which is connected to a square shaft member 139, the other of which is connected with a shaft member 140 having an axial socket to slidingly receive the square shaft member 139. The two universal joints 138 make the shaft 135 flexible or articulate and the telescoping of the square shaft member 139 into the shaft member 140 makes possible changes in length as required to accommodate various positions of adjustment of the outer pair of rotary dispensing members 21.

As may be understood by reference to Figures 3 and 5, the upper end of each articulated shaft 135 extends into a gear box 144 and carries a suitable gear 145 in the gear box that meshes with two corresponding gears 146 carried by the two outer shafts 60. As shown in Figure 5 each of the gears 146 has a hub portion 147 that is fixed to the corresponding shaft 60 by a suitable cross pin 148 and the lower face of the gear 146 rests on a bearing 150 in the gear box to support the shaft 60 and thereby support the corresponding rotary dispensing member 21 at the lower end of the shaft.

As heretofore stated, one of the features of the invention is the rotation of the various rotary dispensing members 21 in such direction as to urge the battery plates P and N in the various plate magazines away from the open sides of the magazines towards the upright bars 53 on the opposite sides of the magazines. Since in the preferred form of my apparatus shown in the drawings, the open sides of the magazines supplying the negative plates face oppositely from the open sides of the magazines supplying the positive plates, it is apparent that as viewed in plan in Figure 3, the rotary dispensing member 21 supporting the negative plates N should rotate oppositely with respect to the corresponding rotary dispensing members 21 supporting the positive plates. It will be noted in Figure 3 that the worm gears 124 associated with the plate magazines 20 for dispensing negative plates N are of opposite pitch with respect to the corresponding worm gears associated with the magazines dispensing the positive plates P to provide the required reverse rotation. The same reversal of rotation for the outer successive pairs of rotary dispensing members 21 is accomplished as may be seen in Figure 2 by the opposite positioning of the bevel gears 136 relative to the bevel gears 137 at each succeeding station along the main drive shaft 100.

For actuation of the reciprocating dispensing member 26 at the bottom of each separator magazine 25 the main drive shaft 100 carries a crank 154 at its outer end as shown in Figures 1 and 2. The crank 154 is connected by a link 155 to a rocket arm 156 that rocks a countershaft 157. At each station along the length of the apparatus the rocking countershaft 157 carries a rocker arm 158 that is operatively connected to a corresponding relatively long rocker arm 160 rotatably mounted on a fixed shaft 160a for actuating the corresponding reciprocating dispensing member 26.

To provide a yielding connection between the rocker arm 158 and the corresponding rocker arm 160, the rocker arm 158 is pivotally connected to an operating rod 161 that slidingly carries a sleeve 162 between a stop flange 163 carried by the rod at an intermediate point and a nut 164 at the outer end of the rod. The sleeve 162 is continuously urged towards the stop flange 163 by a suitable helical spring 165 that is confined between the sleeve and the nut 164. The sleeve 162 is mounted in an opening of the rocker arm 160 and is attached to the rocker arm 160 from opposite sides by a pair of cap screws 166. The spring 165 normally holds the sleeve 162 against the stop flange 163 so that the rocker arm 160 normally follow the movements of the rocker arm 158. If any obstacle seriously impedes the leftward movement of the rocker arm 160, as viewed in Figure 1, the spring 165 will yield. The upper end of each rocker arm 160 is connected by a short link 167 with a pair of ears 168 on the underside of the corresponding reciprocating dispensing member 26.

To operate conveyor belt 14 in the required intermittent manner, a sprocket (not shown) on the countershaft 116 is connected by a sprocket chain 171 with a sprocket 172 that actuates mechanism (not shown) in a gear box 173. The mechanism in the gear box 173 operates in a manner well known in the art to translate continuous input rotation into the desired intermittent rotation on the part of a shaft 174. Shaft 174 extends from gear box 173 to drive the previously mentioned drive roller 15 for actuating the conveyor belt 14.

*Operation*

The operation of the described embodiment of the invention will be readily understood from the foregoing description. The conveyor belt 14 moves intermittently by a distance equalling the spacing between the various stations with plates and spacers deposited during each pause so that assembly stacks of battery plates and separators build up progressively on the conveyor belt. At any one moment the successive stacks may be seen in progressive states of assembly. Thus, when belt 14 pauses intermittently in the course of assembling twenty-one plates and twenty intervening separators, there will be one plate and separator at the first station on the belt, two plates and separators on the belt at the second station, etc., to a final stack of twenty-one plates and twenty separators at the final station. With each intermittent movement of the belt battery plates are dropped simultaneously at all of the twenty-one stations followed with a short time interval by the deposit of separator plates at the first twenty stations simultaneously. With each intermittent movement of the conveyor belt 14 a completely assembled stack of plates and separators is delivered at the discharge end of the machine. Since the stacks on the conveyor belt increase in height progressively, the belt may if desired be slanted or inclined with the lower end at the discharge end of the machine, thereby to minimize the distance the plates fall from the magazines 20.

The apparatus may be operated for example to advance the conveyor belt 14 every three seconds for the delivery of twenty completely assembled stacks per minute. It is apparent that the apparatus will operate automatically without requiring special or continuous attention and that the attendants are free to devote their time solely to keeping the various plate magazines and separator magazines replenished. The open construction of the magazines makes their contents visible at a glance and the magazines are constructed to facilitate replenishment with minimum labor.

My description in detail of the presently preferred embodiment of the invention will suggest to those skilled in the art various changes, substitutions, and other departures from my disclosure that properly lie within the scope and spirit of the appended claims.

I claim:

1. In an apparatus for assembling the plates and separators of a storage battery, the combination of: a conveyor for movement in a path past a series of stations; a magazine at each of said stations to hold a supply of plates, said magazines being disposed directly above said path, and operative to deposit a plate on the conveyor; a magazine at each of said stations to hold a supply of separators, said separator magazine being disposed to one side of said path at a lower level than the plate magazines, and operative to deposit a separator on the conveyor directly under the plate magazines; means to advance said conveyor intermittently from station to station; and means to operate all said plate magazines in unison to drop plates on said conveyor during the pauses of the conveyor and to operate said separator magazines in unison to deposit separators on the conveyor during the same pauses with a timed interval between the depositing of the plates and the depositing of the separators whereby stacks of plates and alternate separators are built up on the conveyor progressively.

2. In an apparatus for assembling the plates and separators of a storage battery, the combination of: a conveyer for movement in a path past a series of stations; a magazine at each of said stations to hold a supply of plates, said magazines being disposed directly above said path, and operative to deposit a plate on the conveyer; a magazine at each of said stations to hold a supply of separators, said separator magazine being disposed to one side of said path, and including a reciprocating dispensing member operative to displace separators from the separator magazine to the conveyer directly under said plate magazines; means to advance said conveyor intermittently from station to station; and means to operate all said plate magazines in unison to drop plates on said conveyor during the pauses of the conveyer and to operate said separator magazines in unison to deposit separators on the conveyer during the same pauses with a timed interval between the depositing of the plates and the depositing of the separators whereby stacks of plates and alternate separators are built up on the conveyer progressively.

3. An apparatus as set forth in claim 2 which includes means to engage the displaced separators on said reciprocating means to prevent return movement of the displaced separators.

4. In an apparatus for assembling the plates and separators of a storage battery, the combination of: a conveyor for movement in a path past a series of uniformly spaced stations; a magazine above said conveyor at each of said stations to hold a supply of plates; a set of rotary members at the bottom of each of said magazines to support the plates in the magazines and by rotation to release the plates one at a time; a magazine to one side of said path at each of said stations to hold a supply of separators; a reciprocatory dispensing member at the bottom of each of said separator magazines to support the separators therein, said member being adapted to shift the separators one at a time onto said conveyor; means to advance said conveyor the distance between successive stations intermittently; a drive shaft extending in a direction of said path and operatively connected with said sets of rotary members, said drive shaft being synchronized with said advancing means to cause said sets of members to release one plate at each of said stations during each pause of the conveyor; a second shaft extending in the direction of said path and operatively connected with said reciprocatory members, said second shaft being synchronized with said advancing means to cause said reciprocatory members to displace one separator onto said conveyor at each station during each pause of said conveyor with a time interval between the release of the plates to the conveyor and the shifting of the separators onto the conveyor.

5. In an apparatus of the character described having a conveyor for progressively assembling stacks of alternate battery plates and separators, the combination therewith of spaced plate dispensers above the path of the conveyor, and spaced separator dispensers adjacent the path of the conveyer each of said plate dispensers comprising: a magazine with upright side members to hold a stack of the plates; spaced rotary dispensing members at the bottom of the magazine, each having a lower peripheral flange and an upper peripheral blade displaced from each other circumferentially and spaced vertically from each other by at least the thickness of a plate whereby in the rotation of the member, first, the flange engages the underside of the bottom plate of the stack, second, the blade engages the next to bottom plate, third, the flange releases the bottom plate to fall to the conveyor through a given distance, and fourth the blade releases the stack to the flange; each of said separator dispensers including a stack of separator plates the lower end of which is at a level below the lower end of the associated battery plate magazine but higher than the conveyer whereby a separator plate may be laterally deposited on top of a battery plate within said given distance after the latter has been dropped onto said conveyor, without being blocked by said battery plate magazine, and means synchronized with the movement of said conveyor to operate said rotary members in unison to drop the plates at spaced locations on the conveyor.

6. A combination as set forth in claim 5 in which one side of said magazine is open to permit additional plates to be added from said one side.

7. A combination as set forth in claim 6 in which said members rotate in directions to urge the plates in the magazine inward from the open side of the magazine.

8. A combination as set forth in claim 5 in which at least some of the rotary dispensing members at the bottom of the magazine are movable laterally for adjustment to accommodate plates of different dimensions.

9. A combination as set forth in claim 8 in which the movable rotary members are connected with a movable side wall of the magazine for simultaneous adjustment of the rotary members and the side wall.

10. A combination as set forth in claim 9 in which said rotary members are driven by a shaft that is flexible for adjustment movement with the rotary members.

11. A combination as set forth in claim 5 in which said conveyor operates intermittently and the rotary members are synchronized to release a plate during each pause in the movement of the conveyor.

12. A combination as set forth in claim 5 in which the peripheral flange and the peripheral blade of each rotary member are adjustable in vertical spacing relative to each other to accommodate plates of different thicknesses.

13. A combination as set forth in claim 12 which includes a removable spacer between each flange and blade whereby a spacer of one thickness may be replaced by a spacer of a different thickness to vary the vertical distance between the flange and blade.

14. In an apparatus of the character described having conveyor means for progressively assembling stacks of alternate battery plates and separators, the combination therewith of spaced separator dispensers to one side of the path of the conveyer, and spaced battery plate dispensers above the path of the conveyer, each of said separator dispensers comprising: a magazine with upright side members to hold a stack of the separators; a reciprocatory dispensing member to support the separators in the magazine, said dispensing member being directed toward said conveyor and having a leading surface to support the stack at one level, a shoulder at the rear of said surface of vertical dimension not more than the thickness of a separator, and a rear surface to support the stack at a higher level, whereby in the reciprocation of the member, first, the stack is supported by said leading surface, second, said shoulder engages the bottom separator of the stack to cause the separator to follow forward movement of the member for displacement from the stack, third, the bottom separator is displaced and the weight of the stack is shifted to said rear support surface, fourth, the dispensing member returns without the displaced separator and the weight of the stack is shifted back to said leading support surface; each of said battery plate dispensers including a stack of battery plates and operative to drop the lowermost battery plate onto said conveyer, the lowermost plate in said stack being at a level above said one level thereby permitting said separator plates to be laterally moved under said battery plate dispenser; and means synchronized with the movement of said conveyor to operate said separator plate dispensing member.

15. A combination as set forth in claim 14 which includes means to engage the displaced separator to keep the displaced separator from following the return movement of the dispensing member.

16. In an apparatus for assembling the plates and separators of a storage battery, the combination of: a conveyor for movement in a path past a series of equally spaced dispensing stations; a magazine at each of said stations above said conveyor to hold a stack of plates; spaced rotary dispensing members at the bottom of each magazine, each member having a lower peripheral flange and an upper peripheral blade displaced from each other circumferentially and spaced vertically from each other by at least the thickness of a plate, whereby in the rotation of the member, first, the flange engages the underside of the bottom plate of the stack, second, the blade engages the next-to-bottom plate, third, the flange releases the bottom plate to fall to the conveyor, and, fourth, the blade releases the stack to the flange; a magazine at each station to one side of said path to hold a stack of separators at a lower level than the corresponding plate magazine but at a higher level than the conveyor; a reciprocatory dispensing member to support the separators in the magazine, said dispensing member being directed toward said conveyor and having a leading surface to support the stack at one level, a shoulder at the rear of said surface of vertical dimension not more than the thickness of a separator, and a rear surface to support the stack at a higher level, whereby in the reciprocation of the member first the stack is supported by said leading support surface, second, said shoulder engages the bottom separator of the stack to cause the separator to follow forward movement of the member for displacement from the stack, third, the bottom separator is displaced and the weight of the stack is shifted to said rear support surface, fourth, the dispensing member returns without the displaced separator and the weight of the stack is shifted back to said leading support surface; means to advance said conveyor the distance between said stations intermittently; means synchronized with the movement of said conveyor to operate said rotary dispensing members in unison to drop a plate at each station during each pause in the movement of the conveyor means; and means synchronized with the movement of the conveyor to operate said reciprocatory members in unison to displace a separator to said conveyor at each station during each pause of the conveyor with a time interval between the operation of the rotary dispensing members and the operation of the reciprocatory dispensing members.

17. In an apparatus for assembling the plates and separators of a storage battery, the combination of: a conveyer for movement in a path past a series of stations; a magazine at each of said stations to hold a supply of battery plates; a magazine at each of said stations to hold a supply of separator plates; one of said magazines at each station being disposed directly above said conveyer path a given distance, the other of said magazines at each station being disposed at the side of that portion of said conveyer path under said one magazine, whereby plates may be dropped from said one magazine through said given distance onto said conveyer and plates may be laterally shifted within said given distance from said other magazine onto said conveyer; means to advance said conveyer intermittently from station to station; and means to operate all said one magazines in unison to drop plates on said conveyer during the pauses of the conveyer and means to operate all said other magazines in unison to deposit plates on the conveyer during the same pauses with a timed interval between the depositing of the plates by the said one magazines and the depositing of the plates by the said other magazines whereby plates from the said one magazines and plates from the said other magazines are alternately built up into stacks on the conveyer progressively.

References Cited in the file of this patent

UNITED STATES PATENTS

| Number | Name | Date |
|---|---|---|
| 1,160,845 | Cheshire | Nov. 16, 1915 |
| 1,161,581 | Anderson | Nov. 23, 1915 |
| 1,272,764 | Blankenhorn et al. | July 16, 1918 |
| 2,216,276 | Mann et al. | Oct. 1, 1940 |
| 2,260,540 | Schramm | Oct. 28, 1941 |
| 2,324,523 | Lund | July 20, 1943 |
| 2,332,531 | Robinson et al. | Oct. 26, 1943 |
| 2,553,683 | Smith | May 22, 1951 |
| 2,568,248 | Nichols et al. | Sept. 18, 1951 |